May 10, 1927.　　　　M. H. KERN　　　　1,628,152
AUTOMOBILE LIGHT DEFLECTOR
Filed July 15, 1925　　　3 Sheets-Sheet 1

Inventor
Mason H. Kern
By
Attorney

May 10, 1927.
M. H. KERN
1,628,152
AUTOMOBILE LIGHT DEFLECTOR
Filed July 15, 1925      3 Sheets-Sheet 2
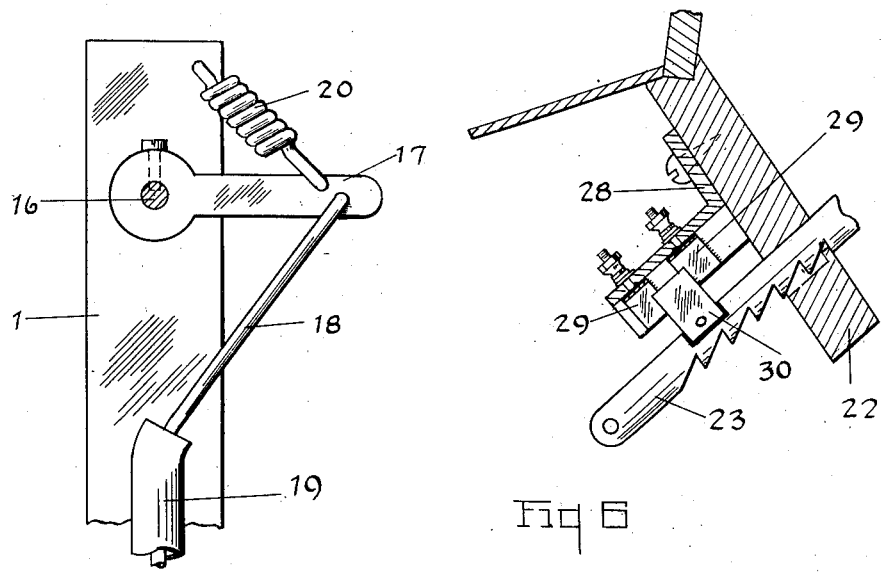
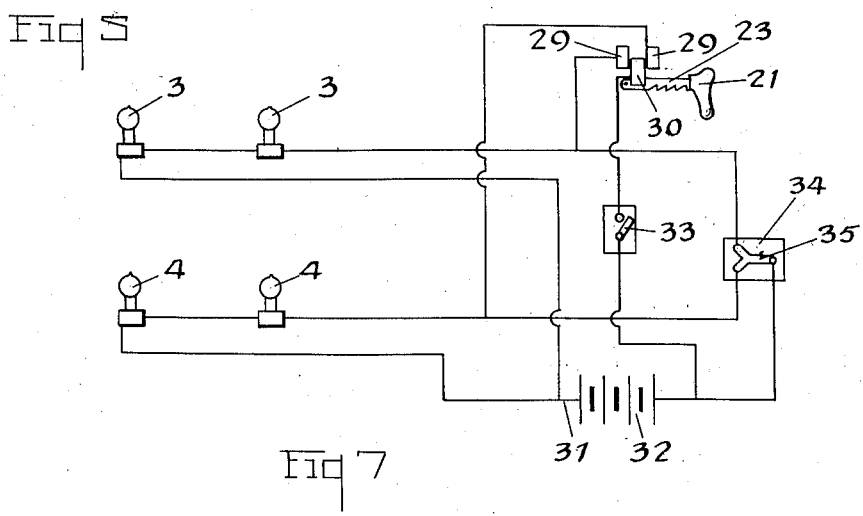
Inventor
Mason H. Kern
By Owen, Owen & Crampton
Attorney May 10, 1927.  M. H. KERN  1,628,152

AUTOMOBILE LIGHT DEFLECTOR

Filed July 15, 1925  3 Sheets-Sheet 3

Inventor

Mason H Kern

By Owen, Owen & Hampton

Attorney

Patented May 10, 1927.

1,628,152

UNITED STATES PATENT OFFICE.

MASON H. KERN, OF TOLEDO, OHIO.

AUTOMOBILE LIGHT DEFLECTOR.

Application filed July 15, 1925. Serial No. 43,664.

My invention has for its object to provide a means whereby the light of an automobile lamp may be spread over an extended area in front of an automobile and completely eliminating the blinding effect of direct rays of light from an electric lamp or its reflector, the particular object of the invention being to provide means for directing refracted rays of light a long distance in advance of an automobile and thus preventing direct rays from entering the eyes of the operator of an approaching car, except as may be produced by the indirect lighting of the road. In the preferred form of my invention the lens of each automobile head light has a portion for concentrating the rays produced by the electric lamp for directing the light a long distance ahead of the lamp that may be used when there is no approaching automobile, and the part that may be brought into use when there is an approaching automobile to prevent blinding the operator of the approaching automobile and which will at the same time operate to refract a major portion of the light in a direction in advance of the automobile on which each head light is located. Thus in connection with devices embodying my invention I have provided a means for turning each lamp from a position where the search light effects of the lamp may be changed to one of broadly diffused or indirect light over a wide area.

The invention may be contained in lamp structures of different forms and to illustrate a practical application and describe the manner in which embodiments of my invention may be used, I have selected two lamp structures as examples of the different structures that embody my invention and shall describe them hereinafter. The structures selected are shown in the accompanying drawings.

Figure 1:
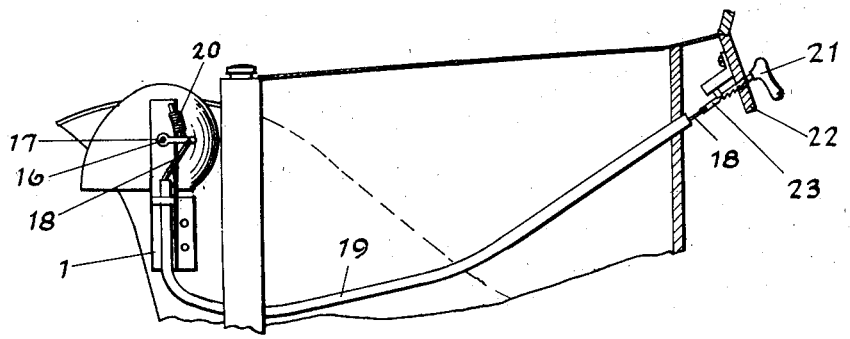
Figure 4:
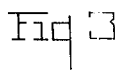
Figure 3:
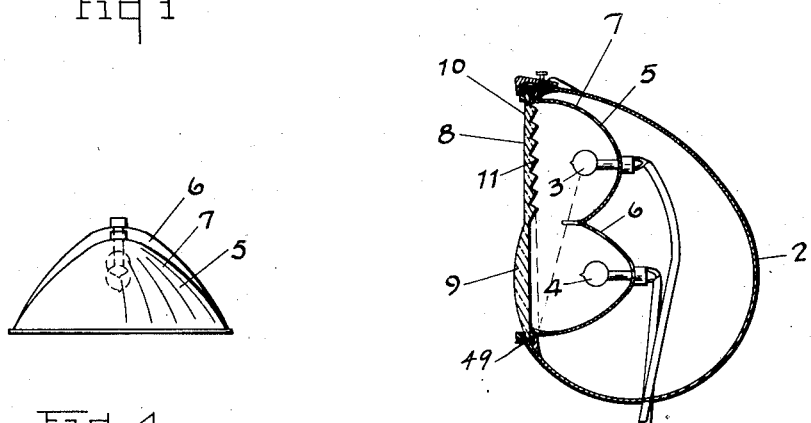
Figure 2:
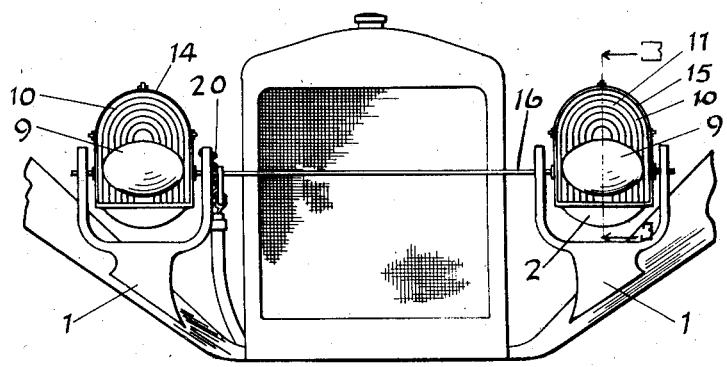
Figure 8:
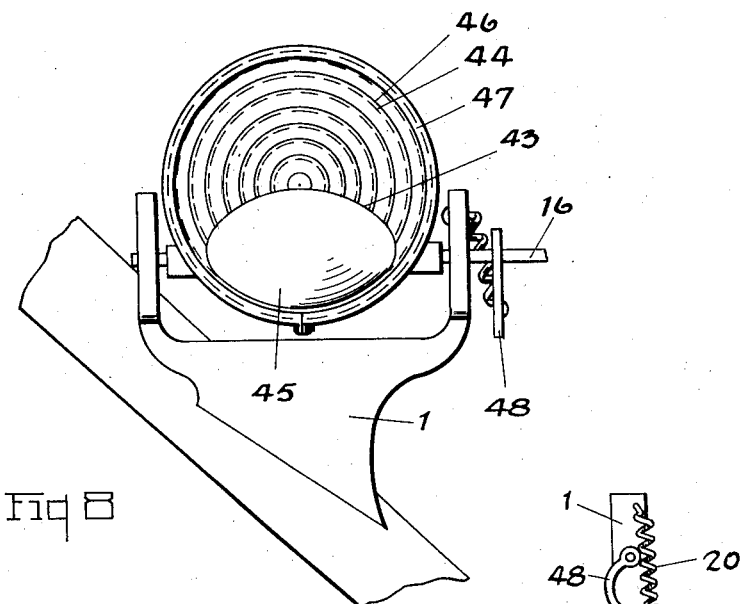
Figure 11:
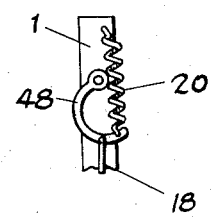
Figure 9:
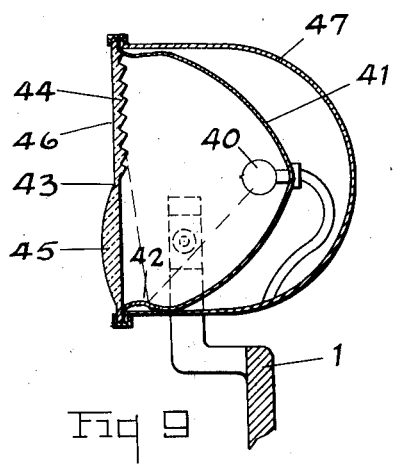
Figure 10:
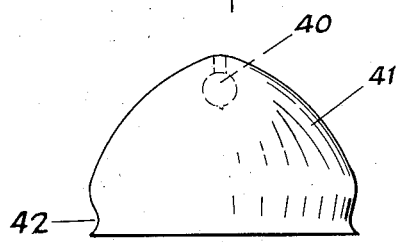

Figure 1 illustrates side view of one of lamps containing my invention and also illustrates the manner in which it may be operated to change it from direct lighting to indirect lighting. Fig. 2 is a front view showing the position in which they may be mounted with reference to the parts of the automobile. Fig. 3 is a view of a section taken on the plane of the line 3—3 indicated in Fig. 2. Fig. 4 is a top view of the reflector of the lamp shown in Fig. 3. Fig. 5 illustrates a part of the means for operating the lamp. Fig. 6 illustrates a switch that may be used for changing the electric connections when a change in the relative position of the lamp is made. Fig. 7 illustrates a system of electrical connections that may be used in conjunction with the form of invention illustrated in Figs. 1 to 6, inclusive. Fig. 8 is a front view of a modified form of a lamp containing the invention. Fig. 9 is a view of a section of the lamp shown in Fig. 8. Fig. 10 illustrates a top view of the reflector of the lamp shown in Figs. 8 and 9, and Fig. 11 illustrates a side view of a means for operating the lamp.

The lamps embodying my invention may be mounted in any suitable manner and in any suitable location upon the automobile in connection with which they are used to light the road in advance of the automobile. The lamps may be supported on suitable brackets 1 that may be mounted on the fenders and suitably placed and bracketed to the chassis of the automobile whereby the lamp may be secured in position as against any vibration due to driving the automobile over the road. Preferably each lamp is backed by a suitable shell 2 in order to make the lamp attractive in appearance and give it an exterior form that conforms substantially to the shape of the lamps that are now commrcially accepted, and also to provide for water shedding and protection of the reflector parts of the lamp and at the same time forming a supporting shell for containing the electric bulb and the reflector and supporting the lens in its proper position relative to the reflector.

In the form of lamp shown in Figs. 1 to 4, inclusive, two electric bulbs 3 and 4 are supported at the proper focal distance and preferably in the focal axis of the parts 5 and 6 of the reflector 7. The parts 5 and 6 of the reflector 7 are located so as to concentrate their direct rays of light of their respective bulbs 3 and 4 towards the parts 8 and 9, respectively, of the lens 10 whereby the desired lighted effects may be produced on the road.

The part 5 of the reflector 7, preferably, approximates a spherical form while the part 8 of the lens 10 to which the light of the lamp 3 is particularly directed by the part 5 of the reflector is provided with a plurality of prismatic ridges that are semicircular in form as shown in Fig. 2, which spread the rays of light over a wide area in front of the lamp by refraction. The spherical form of the part 5 of the reflector cooperates to produce this wide distribution. The part 6 of the reflector 7 is parabolic in form and operates to direct the rays of light in a more concentrated manner towards the part 9 of the lens 10, the two operating as a condenser will direct the rays of light to a long distance in front of the lamp, the parallel relation of the rays of light however, being more or less dependent on the position of the electric bulb 4 relative to the part 6 of the reflector in the manner well known in the art. As shown in Fig. 2 of the drawings, the lens 10 may be formed so that the prismatic ridges 11 cover the lens 10 except for the area of the condensing part 9 of the lens. The condensing part 9 of the lens may be plano convex in form and its outline may be elliptical as shown in Fig. 2 in order to produce a slight spread of the rays of light in front of the automobile.

In lighting the road in front of the automobile where either, or both, portions of the lamp may be used the purpose and the functions of the parts of the lamp, however, are obtained by using a part of the lamp when it is desired to eliminate the objectionable blinding effects of head lamps commonly used in connection with automobiles and the other part of the lamp is used when it is desired to produce a lighted area at a long distance in advance of the automobile. If desired means may be provided for switching the connecting of the electric bulbs so that one will be lighted when one function is to be performed by the lamp, and the other will be lighted when the other function is to be performed by the lamp.

As shown in Figs. 1, 5 and 6 the lamps are so mounted that they may be tilted to place the lens at different angular positions between the vertical and horizontal, and means whereby it may be secured in its adjusted position. The lamps 14 and 15 are connected to a rod 16 that may be rotated so as to rotate the lamps 14 and 15 within the brackets 1. An arm 17 is connected to the rod 16 and a wire 18 located in a tube 19 is connected to the arm 17 and may be longitudinally moved within the tube 19 so as to angularly move the lamps 14 and 15. If desired the arm 17 may be connected to a part of one of the brackets 1 by means of a spring 20 to cause the return movement of the lamp in such a position that it will place the lens 10 in a horizontal position when the wire 18 is released or which will cooperate to cause the lamp to return to this position when the wire 18 is moved towards the lamp. The other end of the wire 18 is connected to a suitable handle in order to produce longitudinal movements of the wire. Preferably the handle 21 is supported on the instrument board 22. It may be connected to a ratchet or rack 23 that extends through the instrument board 22. As a rule the instrument board 22 is faced or covered with sheet metal and the handle 21 may be secured in adjusted positions by causing one or the other of the teeth of the rack 23 to engage an edge portion of an opening through the sheet metal covering of the instrument board 22 in which the rack 23 is located. Any suitable adjustable device having means for securing the lamps in their adjusted positions may be used, the above being merely illustrative of a means whereby this may be accomplished.

In the form of construction shown in Figs. 1 to 4 it is preferable to change the connections from one lamp to the other when the change in the position of the lamp is made, and in order that this may be done when the lamp is changed in its angular position, I have provided a switch for switching the light from one lamp to the other when the handle 21 is drawn to make the change in position. A bracket 28 is secured at the back of the instrument board 22 and a pair of contacts 29 may be insulatingly supported on the bracket 28. Also a contact 30 may be insulatingly supported on the rack 23 and so that when the rack 23 is shifted to change the position of the lamp connection will be made through one or the other of the contacts 29 which are connected to one or the other pair of electric bulbs, the electric bulbs of each pair being located in the same relative position in the lamps. As indicated in the diagram shown in Fig. 7, the bulbs 3 are connected to one contact 29 while the bulbs 4 are connected to the other contact 29, the bulbs may have a common return 31 through the battery 32. A switch 33 may be provided for connecting the battery to the contact 30 which is the controlling contact with reference to the bulbs 3 on the one hand and the bulbs 4 on the other. If it is desired to maintain the bulbs 3 and 4 lighted they may be connected to a switch 34 having a double contact switch arm 35 for completing the circuits one through the bulb 3 and the other through the bulb 4 in parallel or for opening this parallel relation of the circuits. When the switch 25 is closed the bulb will be lighted independent of the operation of the handle 21 and when the switch 34 is open the lighting of the bulbs will be dependent on the position of the handle 21, and consequently on the position of the lamps 14 and 15.

In the form of construction shown in Figs. 8 to 11, inclusive, the electric bulb 40 is located in the focal axis of a parabolic reflector 41 which has, however, an outward flaring skirt 42 which by reflection increases the diffusion of the light. As is well known in connection with reflectors, it is impossible to produce a perfectly smooth surface and consequently the rays of light are reflected from points which in the best of reflectors produce some diffusion of the light and the light cannot be absolutely directed in lines that follow the theoretical rules of reflection of light as to the angles of incidence and reflection, and my invention provides means for utilizing the diffused light for decreasing the area of the road that may be lighted when the lamp is turned in position to prevent a blinding effect caused by radiation direct from the bulb or reflector to the eye of the operator of the approaching car. The flaring skirt 42, however, coacts to increase the amount of light that is thus diffused since the flaring portion of the reflector does not conform to the substantially parabolic portion of the reflector 41. The lens 43 is also provided with circular prismatic ridges 44 as shown in Fig. 8 that cover the lens except for the plano convex portion 45 which is located in the lower half of the lens and which is elliptical in outline. The light reflected from the upper half of the reflector 41 and the light from the bulb 40 that passes through the upper half of the lens 43 will be spread over a wide area by the prismatic ridges 44 that in the main cover the upper portion 46 of the lens 43 and all of the diffused light that is reflected from the lower half of the reflector 41 and which also passes through the upper half of the lens 43 while on the other hand all of the light that is reflected from the lower half of the reflector 41 will pass through the lens 45 as well as some of the light from the bulb 40. The reverse curved portion of the skirt 42 will also cause deflection and increase the quantity of diffused or irregularly directed light that passes through the part 46 of the lens 43 which will increase the radius of the lighted area of the road.

The lamp 47 is supported by the bracket 1 and is connected to the rod 16. A similar lamp 47 may also be connected to the other end of the rod 16 in the manner shown in Fig. 2. The rod 16 and the lamps 47 connected thereto may be turned angularly by means of the arm 48 that is connected to the rod 16. In order to move the lamps 47 angularly the arm 48 may be connected to the wire 18 and the retractile spring 20 may be connected to the end of the arm 48 and to one of the brackets 1 which will cooperate in the movement of the angular position and secured therein by the rack 23 or similar device. When a car is approaching, the lamp 47 is preferably turned so as to place the lens 43 in a horizontal position and the light will be diffused over a large area in front of the automobile. When, however, there is no one approaching, the lamp may be turned so that the lens will be located in a vertical position and the full benefit of the condensing part of the lens 45 and the parabolic reflector will be obtained to produce rays of light which will light the road along the lone distance ahead of the automobile.

In the form of construction shown in Figs. 1 to 4 inclusive, the lower edge of the reflector 7 may be provided with a reverse curved and flaring skirt portion 49 that will operate to reflect a portion of the light from the bulb 3 towards the prismatic ridges 11.

I claim:

1. In an automobile lamp, a lens, a planoconvex area located on the lower portion of the glass, the convex area being formed in the outer surface of the glass and substantially elliptical in outline, the major axis of the ellipse being in a substantially horizontal plane, the upper portion of the glass having a plurality of semi-circular prismatic ridges formed on the inner surface, two sources of light and means for tilting the lamp to direct the rays from one source through one of the said portions to the road and for tilting the lamp to direct the rays from the other of the said sources through the other of said portions to the road.

2. In an automobile lamp, a two part reflector, a lens, an electric bulb located in each of the parts of the reflector, a member connected to the lamp for tilting the lamp to place the lens in different positions between the horizontal and the vertical, a pair of branch circuits, one of the electric bulbs located in each circuit and the member having contacts for switching the circuits when the member is moved to move the lamp angularly beyond a predetermined point.

3. In an automobile lamp, a two part reflector, a lens having semi-circular prismatic ridges located in front of one part of the reflector and a plano convex portion located in front of another part of the reflector, an electric bulb located in each of the parts of the reflector and in front of each of the portions of the lens, means for tilting the lamp so as to place the lens in different positions between the horizontal and the vertical, a pair of branch circuits, an electric bulb located in each circuit and means for switching the circuits when the lamp is changed angularly.

In testimony whereof, I have hereunto signed my name to this specification.

MASON H. KERN.